United States Patent Office.

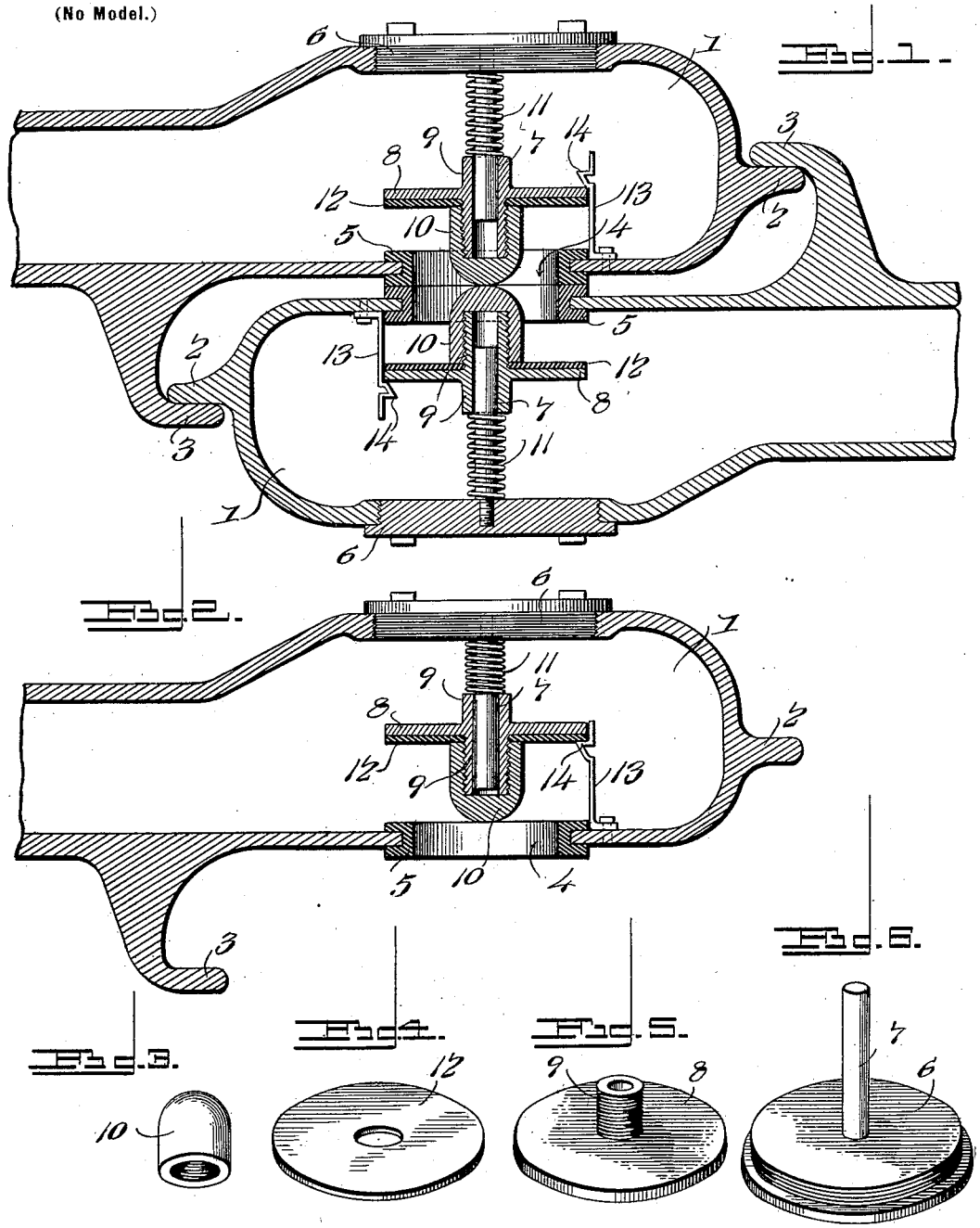

FRANK E. TANNEY, OF BEAVER FALLS, PENNSYLVANIA, ASSIGNOR OF THREE-FOURTHS TO LOUIS KRESS, JACOB A. FREED, AND JOHN G. KRESS, OF SAME PLACE.

BRAKE-PIPE COUPLING.

SPECIFICATION forming part of Letters Patent No. 626,778, dated June 13, 1899.

Application filed January 21, 1899. Serial No. 702,969. (No model.)

*To all whom it may concern:*

Be it known that I, FRANK E. TANNEY, a citizen of the United States, residing at Beaver Falls, in the county of Beaver and State of Pennsylvania, have invented a new and useful Brake-Pipe Coupling, of which the following is a specification.

My invention relates to pipe and hose couplings particularly adapted for use in connection with air-brakes, and has for its object to provide a simple and efficient valve mechanism adapted for closing the communicating ports of the coupling members, the valves being held unseated when corresponding coupling members are arranged in operative relation to establish communication between adjoining brake-pipe sections, and particularly to provide simple and efficient means whereby the valve in a coupling member constructed in accordance with my invention may be secured in an open position to adapt said member for engagement and use in connection with a coupling member of a different type, which may not be provided with a valve adapted for unseating that embodied in my improved coupling.

Further objects and advantages of this invention will appear in the following description, and the novel features thereof will be particularly pointed out in the appended claims.

In the drawings, Figure 1 is a longitudinal sectional view of connected coupling members constructed in accordance with my invention. Fig. 2 is a similar view of a single coupling member wherein the valve is secured in its retracted or open position. Figs. 3, 4, 5, and 6 are detail views, respectively, of the cap, washer, valve-disk, and head, which combine to form a valve mechanism in accordance with my invention.

Similar reference characters indicate corresponding parts in all the figures of the drawings.

The coöperating members of the coupler embodying my invention are identical in construction, each having a hollow head or body portion 1, provided with lips 2 and 3 for engagement with corresponding parts of the coöperating member, and each being further provided at its inner side with a port 4, fitted with a gasket or packing-ring 5, forming a valve-seat, the preferred construction of gasket or packing-ring being such as to embrace the edge of the wall bounding said port to project slightly beyond the inner and outer surfaces of said wall. Thus when two corresponding coupling members constructed as described are engaged those portions of the gaskets or packing-rings which project toward each other beyond the inner surfaces of said walls come in contact to form an air-tight joint, while the portions of the gaskets or packing-rings which project in the opposite directions beyond the outer surfaces of said walls form yielding valve-seats. Furthermore, in the outer wall of each coupling member is formed an access-opening fitted with a removable head 6, preferably threaded in place and carrying a central guide-pin 7, upon which is mounted for sliding movement a valve-disk 8, preferably having a central enlargement 9. This enlargement is smooth-bored to fit the guide-pin 7, and that portion of the enlargement which projects inwardly from the plane of the disk is exteriorly threaded for engagement by a removable bearing-cap 10, having a spherically-rounded inner end designed to project through and beyond the plane of the valve-seat when in its normal position. The valve-disk is held in its normal position or seated by means of an actuating-spring 11, coiled upon the guide-pin 7 between the inner surface of the head 6 and the outer end of the enlargement 9, and secured in contact with the inner surface of the valve-disk by means of the cap 10 is a packing-disk 12.

As above indicated, the bearing-cap 10, which is of less diameter than the port 4, is adapted to project through and beyond the plane of the latter when the valve is seated, and hence when two coupling members constructed in accordance with my invention are brought into operative relation the opposing caps 10 come into contact and both of the valves are unseated and held in the position indicated in Fig. 1 to open the ports of communication between the hollow members, whereby the braking fluid, whether of air, steam, or the equivalent thereof, is allowed a free passage. It is sometimes desirable, however, to provide for maintaining the pipe-coupler at the front end of each car in an open position, whereby in case of a separation of a train the brake-pipe upon the rear or detached portion of the train will be exhausted to allow the setting of the brakes, while the exhaust of the brake-pipe upon the front portion of the train is prevented to enable the front portion to leave the detached rear portion; also, it is desirable to provide in a coupler of the class to which my invention belongs for engagement thereof with a coupling member of a different construction which may not embody means for repressing and unseating the valve. Hence in connection with each coupling member I employ a retaining device consisting, in the construction illustrated, of a yielding or spring arm 13, having a stop 14, of which the inner face is beveled, while the outer face is abrupt or shouldered, said arm being secured to the inner wall of the coupling member with the stop in the path of the edge of the valve-disk. The parts are so related that when coupling members of like construction are united the valve-disks will not be repressed sufficiently to cause the engagement thereof with the stops 14, and the resistance offered by the beveled faces of said stops to the outward movement of the valve-disks is such as to prevent further outward movement of the disks by the pressure of the braking fluid (as air or steam) sufficiently to cause such engagement. When, however, it is desired to leave the valve in the coupling member at the front end of a car in an open or unseated position for the purpose above indicated or when it is desired to engage a coupling member of my improved construction with a member unprovided with means for repressing the valve, the valve-disk may be manually repressed beyond its normal unseated position or sufficiently to cause its engagement with the abrupt side or shoulder of the stop 14, as indicated in Fig. 2. This retaining device constitutes a simple and efficient means for securing the valve in an unseated position.

It will be understood that in practice various changes in the form, proportion, and the minor details of construction may be resorted to without departing from the spirit or sacrificing any of the advantages of the invention.

Having described my invention, what I claim is—

1. A coupling member having a movable port-closing valve provided with a projecting portion for contact with that of a corresponding valve of a coöperating member, and automatic means for securing said valve in an unseated position when repressed beyond its normal unseated position, substantially as specified.

2. A coupling member having a movable port-closing valve provided with a projecting portion for contact with that of a corresponding valve of a coöperating member, and a spring-actuated stop arranged in the path of an edge of the valve for engaging and securing the latter in an unseated position, substantially as specified.

3. A coupling member having a movable port-closing valve provided with a projecting portion for contact with that of a corresponding valve of a coöperating member, and a yielding arm having a stop arranged in the path of an edge of the valve, said stop having a beveled inner and an abrupt outer face, and adapted to engage the valve to secure it in an unseated position, substantially as specified.

4. A coupling member having a spring-actuated port-closing valve consisting of a disk provided with a central smooth-bored enlargement, a removable head closing and opening in the outer side of the coupling member, and carrying a guide-pin extending into the bore of said enlargement of the disk, a valve-seating spring interposed between said disk and the head, a packing-disk arranged in contact with that surface of the disk which is adjacent to the valve-seat, and a cap removably fitted upon said enlargement of the disk and bearing against the packing-disk to retain it in operative position, the inner free end of said cap being spherically rounded for contact with that of a corresponding cap on the valve of a coöperating coupling member, substantially as specified.

In testimony that I claim the foregoing as my own I have hereto affixed my signature in the presence of two witnesses.

FRANK E. TANNEY.

Witnesses:
J. B. RAYL,
J. C. WHITE.